United States Patent Office 3,343,163
Patented Sept. 19, 1967

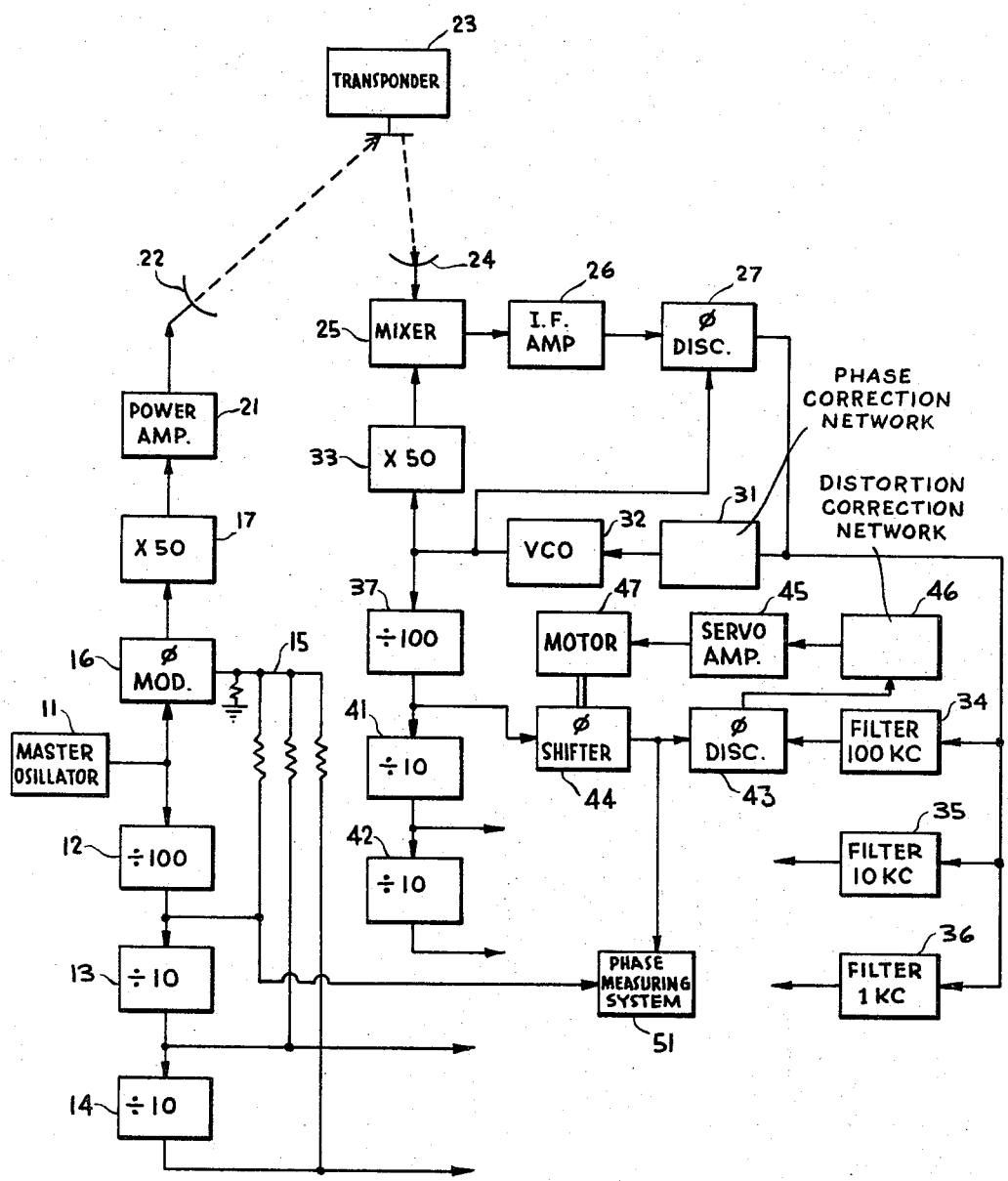

3,343,163
DISTANCE MEASURING SYSTEM
James W. Crooks, Jr., San Diego, and Robert C. Weaver, La Jolla, Calif., assignors to General Dynamics Corporation, San Diego, Calif., a corporation of Delaware
Filed Nov. 12, 1963, Ser. No. 322,907
5 Claims. (Cl. 343—12)

This invention relates to a tracking device for determining the range of mobile vehicles, and more particularly to a tracking device including a ground transmitter and receiver operating in conjunction with a vehicle-borne transponder for accurate determination of distance at long range with minimum transponder power requirements.

As is well known to those skilled in the art, there is an inverse relationship between transmitted power and receiver bandwidth in the reception of information from a distant source. The received signal-to-noise ratio is, therefore, dependent upon the range, the power output of the transponder, and the bandwidth of the receiver, among other variables known to those skilled in the art. It will be apparent that if the bandwidth can be reduced, the signal-to-noise ratio can be improved, or range can be increased, or transponder power on the tracked vehicle may be reduced.

Tracking space vehicles from ground stations presents a particularly difficult problem. The power available aboard a space vehicle for a tracking transponder is extremely limited, while distances may be extremely large. The present invention enables tracking of space vehicles to greater distances with lower power than has been possible heretofore. By synthesizing ranging tones from a carrier phase-locked receiver, very narrow bandwidths can be employed in range measurements made at the modulation frequency, thereby improving the receiver noise figure.

It is therefore, an object of this invention to provide a range tracking device operable at great distances.

Another object of this invention is to provide a range tracking device wherein the transmitted carrier and a plurality of modulating ranging signals are derived from a common oscillator.

Another object of this invention is to provide a range tracking device wherein the receiver synthesizes received ranging signals.

Another object of this invention is to provide a range tracking device wherein narrow effective bandwidth enables a high effective signal-to-noise ratio.

Another object of this invention is to provide a range tracking system which is accurate, efficient, reliable, and simple to build and operate.

Other objects and advantages of the present invention will become apparent from the following specification and appended drawing, wherein the sole figure illustrates a block diagram of an embodiment of the present invention.

Referring to the drawing, a master oscillator 11 at a base station provides the carrier and a multiplicity of modulating signals. The master oscillator operates, exemplarily, at a frequency of ten megacycles. The ten megacycle signal from master oscillator 11 is applied to a chain of frequency dividers including a first frequency divider 12 providing a 100 kilocycle output signal, a second frequency divider 13 providing a ten kilocycle output signal, and a third frequency divider 14 providing a one kilocycle output signal.

The three output signals from the chain of frequency dividers are combined in a resistive summing circuit 15 and employed to phase modulate the ten megacycle signal from master oscillator 11 in phase modulator 16.

A frequency multiplier 17 multiplies the modulated ten megacycle signal from phase modulator 16 to a frequency of 500 megacycles. Power amplifier 21 amplifies the phase modulated 500 megacycle signal and applies it to antenna 22 for transmission.

The vehicle to be tracked, not shown, carries a transponder 23. Transponder 23 may conveniently be of the general type disclosed in U.S. Patent No. 2,972,047, issued Feb. 14, 1961 to R. V. Werner et al. for "Transmitter Receiver." As disclosed in the patent, such a transponder includes a mixer and a voltage controlled local oscillator, an intermediate frequency amplifier, a discriminator, a modulator connected to the voltage controlled oscillator, a single antenna connected to the mixer and voltage controlled oscillator for transmitting and receiving, and a pair of filters, one connecting the antenna to the mixer and the other connecting the antenna to the voltage controlled oscillator. In operation, the transponder receives a modulated signal at one frequency and transmits a signal with identical modulation offset in frequency by an amount equal to the intermediate frequency.

In the present invention, transponder 23 receives the modulated 500 megacycles signal. The 500 megacycle carrier, however, is Doppler shifted by the relative radial velocity between the base station and the vehicle carrying the transponder. The frequency $f_2$ of the carrier received by the transponder 23 may be expressed as $f_2 = f_1(1 + v_r/c)$, wherein $f_1$ is the transmitted carrier frequency, $v_r$ is radial velocity and $c$ is the velocity of propagation, which is substantially the velocity of light.

Transponder 23 retransmits signal $f_2$ displaced in frequency as signal $f_3$. Conveniently the frequency of $f_3$ may be displaced by transponder 23 by a factor 50/49. Thus, receiving a frequency $f_2$ of nominally 500 megacycles, the transponder transmits a signal at a frequency $f_3$ of 490 megacycles.

The signal transmitted from the vehicle-borne transponder 23 is received by ground station antenna 24. Another Doppler frequency shift occurs due to vehicle radial velocity, whereby the signal received at antenna 24 is at a frequency $f_4 = f_3(1 + v_r/c)$, wherein $f_3$ is the frequency transmitted by the vehicle-borne transponder, $v_r$ is the radial velocity and $c$ is the velocity of propagation.

The nominal 490 megacycle signal transmitted by transponder 23 and received by antenna 24 is applied to a mixer 25. Mixer 25 forms part of a phase lock loop, including intermediate frequency amplifier 26, phase discriminator 27, phase correcting network 31, voltage controlled local oscillator 32, and frequency multiplier 33. Voltage controlled oscillator 32 operates at a nominal frequency of ten megacycles. Frequency multiplier 33 raises the local voltage controlled oscillator frequency to a frequency $f_b$ of 500 megacycles. The 500 megacycle signal from frequency multiplier 33 is combined in mixer 25 with the received 490 megacycle signal. A ten megacycle difference frequency from mixer 25 is selected and amplified by intermediate frequency amplifier 26.

Phase discriminator 27 compares the ten megacycle signal from the voltage controlled oscillator 32 with the intermediate frequency ten megacycle signal, recovering the modulating signals and an oscillator control signal. The 100 kilocycle modulating signal is selected by filter 34, the ten kilocycle modulating signal is selected by filter 35, and the one kilocycle modulating signal is selected by filter 36. A low frequency or varying D.C. oscillator control signal, also recovered from phase discriminator 27, is connected to voltage controlled oscillator 32 through network 31. As disclosed hereinabove, voltage controlled oscillator 32 forms part of a phase lock loop, of a type well known to the art. When the loop is locked, the frequency $f_a$ of the signal produced by the voltage controlled oscillator is equal to, and 180 degrees out of phase with $f_c$, the frequency of the difference signal from mixer 25. That is, $f_c = -f_a$. Since the signal from frequency multiplier 33, at frequency $f_b=50f_a$, and $f_c=f_b-f_4$, it will be apparent that $f_4=(50-1)f_a=49f_a$.

The ten megacycle signal from voltage controlled oscillator 32 is also applied to a serial chain of frequency dividers. Frequency divider 37 divides the ten megacycle signal by 100, producing a 100 kilocycle signal then to frequency divider 41 producing a ten kilocycle signal, and to frequency divider 42 producing a one kilocycle signal.

The received modulating signals may be very weak, noisy and subject to fading. For accurate measurement of distance, signals having like frequency and phase are generated. Exemplarily of the 100 kilocycle, ten kilocycle and one kilocycle signals, the 100 kilocycle received modulating signal is selected by filter 34 and applied to a phase discriminator 43. The locally generated 100 kilocycle signal from frequency divider 37 is applied to phase discriminator 43 through a phase shifter 44. An error signal from phase discriminator 43 is applied to a servo amplifier 45 through distortion correcting network 46. Servo amplifier 45 actuates servo motor 47, which drives phase shifter 44 in the sense required to reduce the error voltage to zero.

The 100 kilocycle signal appearing at the output of phase shifter 44 is thus equal in frequency and identical in phase with the received 100 kilocycle modulating signal. This synthesized signal may be accurately compared with the transmitted 100 kilocycle modulating signal in a precision phase measuring system 51. Phase measuring system 51 is connected to the output of phase shifter 44, and to the output of frequency divider 12. Phase measuring system 51 may be of the general type disclosed in U.S. Patent No. 2,933,682, issued Apr. 19, 1960 to A. B. Moulton et al. for "Frequency Measuring Apparatus." Alternatively, phase measuring system 51 may be the type disclosed in FIGURE 9 of U.S. Patent No. 3,025,520, issued Mar. 13, 1962 to R. V. Werner et al. for "Position Determining Device."

As will be apparent, the ten kilocycle signals from filter 35 and frequency divider 41 are applied to a ten kilocycle signal synthesizing circuit (not shown) substantially similar to the 100 kilocycle synthesizing circuit including phase discriminator 43, phase shifter 44, network 46, amplifier 45 and motor 47. A third such circuit is connected to one kilocycle filter 36 and to frequency divider 42. Similarly, ten kilocycle and one kilocycle phase measuring systems similar to phase measuring system 51 are provided, connected to their respective synthesizing circuits and to frequency dividers 13 and 14, respectively.

Distance between the base station and vehicle-borne transponder 23 is measured in a manner similar to that disclosed in said U.S. Patent No. 3,025,520. As discussed more fully therein, a coarse range determination obtained by measuring the phase difference between the transmitted and received one kilocycle signal is employed to resolve the ambiguity of an intermediate range determination employing the ten kilocycle modulating signal. Similarly, the ten kilocycle determination is employed to resolve the ambiguity of a fine measurement employing the 100 kilocycle signal.

Thus, by synthesizing signals at the receiver having the same frequency and phase as the received signal, and employing narrow band frequency modulation, a weak, noisy, fading signal may be reconstructed to enable accurate, precision distance measurements. The present invention, therefore, enables distance measurements over longer ranges, or alternatively, employing a less powerful transponder, than has heretofore been possible.

While a presently preferred embodiment of this invention has been specifically disclosed, it is understood that the invention is not limited thereto as many variations will be readily apparent to those skilled in the art and the invention is to be given its broadest possible interpretation within the scope of the following claims.

We claim:

1. A base transmitter and receiver for distance measuring of the type cooperating with a remote transponder comprising a master oscillator, a frequency divider modulating signal source connected to said master oscillator generating a modulating signal at a sub-multiple of the frequency of said master oscillator, a modulator connected to said master oscillator and to said modulating signal source, means for transmitting the modulated signal to said transponder, receiving means for receiving a modulated signal from said transponder, said receiving means comprising a phase lock loop including a receiver oscillator operative at an intermediate frequency, a mixer, an intermediate frequency amplifier coupled to said mixer and operative at said intermediate frequency, a frequency translator for applying signals from said receiver oscillator to said mixer and a demodulator for controlling said receiver oscillator and recovering a modulating signal, signal synthesizing means connected to said receiver oscillator and to said demodulator for generating a signal having the same frequency and phase as the recovered modulating signal, and phase measuring means connected to said synthesizing means and to said modulating signal source.

2. A base transmitter and receiver for distance measuring of the type cooperating with a remote transponder comprising a master oscillator, a frequency divider modulating signal source connected to said master oscillator generator a modulating signal at a sub-multiple of the frequency of said master oscillator, a modulator connected to said master oscillator and to said modulating signal source, means for transmitting the modulated signal to said transponder, receiving means for receiving a modulated signal from said transponder, said receiving means comprising a phase lock loop including a receiver oscillator operative at an intermediate frequency, a mixer, an intermediate frequency amplifier coupled to said mixer and operative at said intermediate frequency, a frequency translator for applying signals from said receiver oscillator to said mixer and a demodulator for controlling said receiver oscillator and recovering a modulating signal, signal synthesizing means connected to said receiver oscillator and to said demodulator for generating a signal having the same frequency and phase as the recovered modulating signal including a frequency divider connected to said receiver oscillator, a phase shifting servo system connected to said frequency divider, and a phase discriminator operatively connected to said frequency divider, to said servo system, and to said demodulator, and phase measuring means connected to said synthesizing means and to said modulating signal source.

3. A base transmitter and receiver for distance measuring of the type cooperating with a remote transponder comprising a master oscillator, a plurality of frequency divider modulating signal sources connected to said master oscillator generating modulating signals at a plurality of sub-multiples of the frequency of said master oscillator, a modulator connected to said master oscillator and to said modulating signal sources, means for transmitting the modulated signal to said transponder, receiving means for receiving a modulated signal from said transponder, said receiving means comprising a phase lock loop including a receiver oscillator operative at an intermediate frequency, a mixer, an intermediate frequency amplifier coupled to said mixer and operative at said intermediate frequency, a frequency translator for applying signals from said receiver oscillator to said mixer and a demodulator for controlling said receiver oscillator and recovering modulating signals, a plurality of filters for separating said modulating signals, a plurality of signal synthesizing means connected to said receiver oscillator and to said demodulator each for generating signals having the same frequency and phase as different ones of the recovered modulating signals, each of said signal synthesizing means including a frequency divider connected to said receiver oscillator, phase shifting means connected to said frequency divider, and a phase discriminator operatively connected to said frequency divider to said phase shifting means and to said demodulator, and a plurality of phase measuring means, each connected to one of said synthesizing means and to one of said frequency dividers.

4. A base transmitter and receiver for distance measuring of the type cooperating with a remote transponder comprising a master oscillator, a plurality of frequency divider modulating signal sources connected to said master oscillator generating modulating signals at sub-multiples of the frequency of said master oscillator, a modulator connected to said master oscillator and to said modulating signal sources, a frequency multiplier connected to said modulator, means for transmitting the modulated signal to said transponder at a first frequency, receiving means for receiving a modulated signal from said transponder at a second frequency offset from said first frequency, said receiving means comprising a phase lock loop including a receiver oscillator operative at an intermediate frequency equal to the offset between said first frequency and said second frequency, a mixer, an intermediate frequency amplifier coupled to said mixer and operative at said intermediate frequency, a frequency multiplier for applying signals from said receiver oscillator to said mixer and a demodulator for controlling said receiver oscillator and recovering modulating signals, a plurality of filters for separating said modulating signals, a plurality of signal synthesizing means connected to said receiver oscillator and to said demodulator each for generating signals having the same frequency and phase as a different one of the recovered modulating signals, each of said signal synthesizing means including a frequency divider connected to said receiver oscillator, a phase shifter connected to said frequency divider, a servo system for operating said phase shifters, a phase discriminator operatively connected to said frequency divider and to said filter for controlling said servo system, and phase measuring means connected to said synthesizing means and to said modulating signal sources.

5. A base transmitter and receiver for distance measuring of the type cooperating with a remote transponder comprising a master oscillator, a plurality of frequency divider modulating signal sources connected to said master oscillator generating modulating signals at sub-multiples of the frequency of said master oscillator, a phase modulator connected to said master oscillator and to said modulating signal sources, a frequency multiplier connected to said phase modulator, means for transmitting the phase modulated signal to said transponder at a first frequency, receiving means for receiving a phase modulated signal from said transponder at a second frequency offset from said first frequency, said receiving means comprising a phase lock loop including a receiver oscillator operative at an intermediate frequency equal to the offset between said first frequency and said second frequency, a mixer, an intermediate frequency amplifier coupled to said mixer and operative at said intermediate frequency, a frequency multiplier for applying signals from said receiver oscillator to said mixer and a first phase discriminator for controlling said receiver oscillator and recovering modulating signals, a plurality of filters for separating said modulating signals, a plurality of signal synthesizing means connected to said receiver oscillator and to said first phase discriminator each for generating a signal having the same frequency and phase as a different one of the recovered modulating signals, each of said signal synthesizing means including a frequency divider connected to said receiver oscillator, phase shifting means connected to said frequency divider, and a second phase discriminator operatively connected to said frequency divider, to said phase shifting means, and to one of said filters, and a plurality of phase measuring means each connected to different pairs of said plurality of said synthesizing means and said modulating signal sources which operate to provide signals of like frequency.

References Cited
UNITED STATES PATENTS

| | | | |
|---|---|---|---|
| 2,248,727 | 7/1941 | Strobel | 343—12 |
| 2,340,432 | 2/1944 | Schock | 325—351 |
| 2,665,420 | 1/1954 | Winterhalter | 343—12 |
| 2,779,018 | 1/1957 | Gregoire et al. | 343—12 |
| 3,117,280 | 1/1964 | Palmer | 325—351 |

RODNEY D. BENNETT, *Primary Examiner.*

CHESTER L. JUSTUS, *Examiner.*

E. T. CHUNG, M. F. HUBLER, *Assistant Examiners.*